United States Patent Office 2,951,719
Patented Sept. 6, 1960

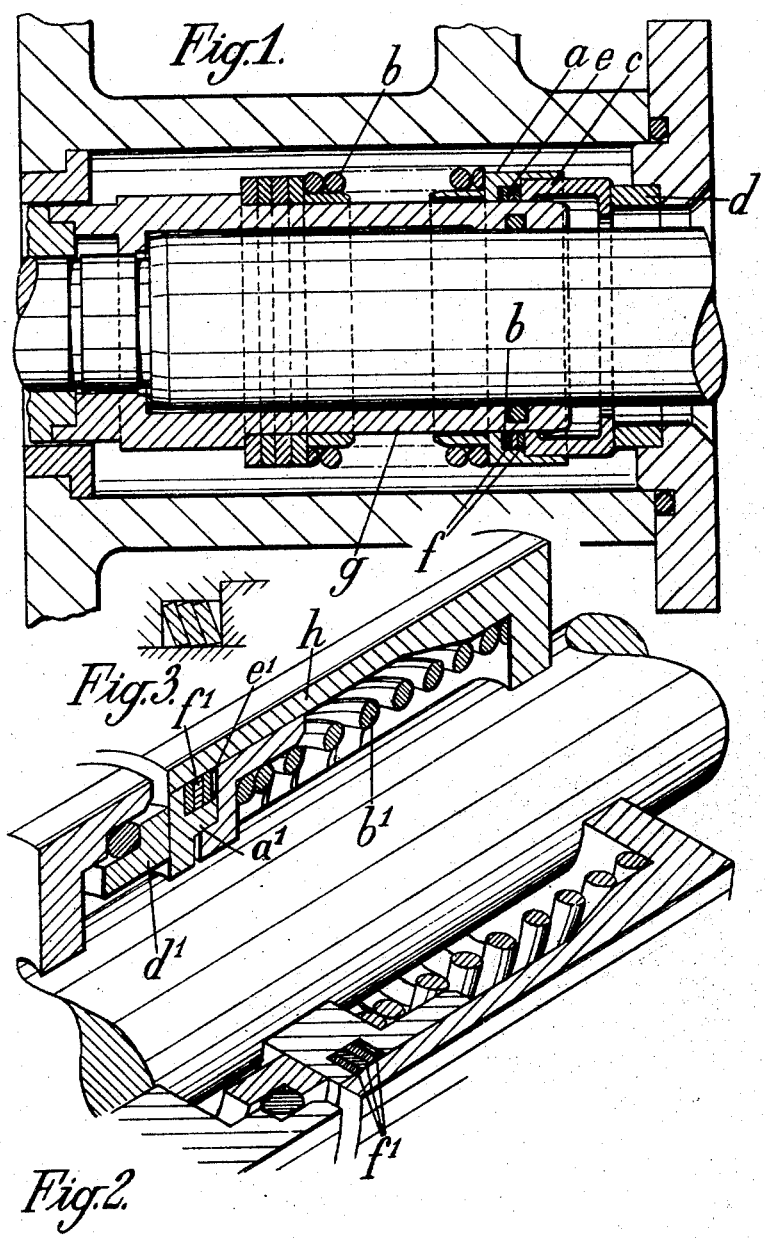

2,951,719
MECHANICAL SEALS

Frederick B. Porges, Hale Burns, England, assignor to Flexibox Limited, Manchester, England, a British company Filed Jan. 19, 1959, Ser. No. 787,738

Claims priority, application Great Britain Jan. 27, 1958

2 Claims. (Cl. 286—11.15)

This invention relates to mechanical seals for making a sealing joint between relatively rotating parts and more particularly to mechanical seals in which one of the sealing rings is axially movable and may be loaded by a spring, pneumatically, hydraulically, or magnetically, and may be rotary or stationary. For convenience, the loading means will be referred to as a spring, but other loading means must be taken as included in such term. The spring means bears upon an axially movable sleeve which constitutes or contains a sealing ring. It is necessary to provide a secondary seal between the axially movable sleeve and a shaft or sleeve therein or between the axially movable sleeve and an external part.

Difficulty has been experienced in providing a satisfactory secondary seal with usual packing materials and designs of seal. For example, the friction between the sealing material of the secondary seal and the part upon which it should slide may be sufficient to prevent the sealing ring following up axial movement of the said part. This may cause difficulty where the spring load is transmitted through the packing which constitutes the secondary seal.

The object of the present invention is to provide a simple and efficient secondary sealing means for a mechanical seal as aforesaid, in which the spring load is not transmitted through the packing material of the secondary seal.

In accordance with this invention, the secondary sealing means which are located in an internal or external annular groove in or on the axially movable part consist of a plurality of thin plastic washers, the groove having a somewhat greater width than the sum of the washer thicknesses. The washers are an interference fit at both their internal and external diametral surfaces on the parts between which a seal is to be made so that radial compression of the washers on assembly results in some compressive strain and possibly some dishing, the latter effect resulting in part from the essential sliding movement during assembly of the mechanical seal. The result is that the several washers produce a series of lines of sealing contact, as many as there are washers. Good flexibility in the secondary seal is therefore obtained to deal with mis-alignment of the parts between which a seal is to be made.

It is preferred to make the sealing washers of the plastic material polytetrafluoroethylene (PTFE) though other plastic materials such as nylon or polytrifluorochloroethylene (PTFCE) may be used.

Referring to the accompanying explanatory drawings:

Figure 1 is a sectional view of a mechanical seal having the improved arrangement of sealing washers incorporated therein in one convenient form. Such washers are on the interior of the axially movable sleeve.

Figure 2 is a part sectional view of a mechanical seal having the sealing washers located in the exterior of the axially movable part.

Figure 3 is a detail view drawn to a larger scale of the sealing washers shown in Figure 1 showing how they can be displaced during assembly.

In Figures 1 and 3, the mechanical seal comprises a part $a$ loaded by the spring $b$ so that it presses the sealing ring $c$ against the ring $d$, the parts $c$ and $d$ forming the mechanical seal. Within the part $a$ is an annular recess $e$ in which are located a number of annular sealing rings or washers $f$, the total thickness of these being less than the axial length of the recess $e$. The washers $f$ are an interference fit in the peripheral wall of the recess $e$ and also an interference fit around the sleeve with which they make a sealing joint. When the washers are being pressed from right to left into the recess $e$, they will be compressed radially and they may assume a slightly dished form as shown in Figure 3. Their freedom to assume such a form ensures good flexibility of the seal with the possibility of taking care of any misalignment of the parts $a$ and $g$.

In Figure 2, the axially movable spring loaded member $a^1$ has the recess $e^1$ for the washers $f^1$ on its outer peripheral part, the washers making a sealing joint between the member $a^1$ and the part $h$ around it. The arrangement of the sealing washers functions as in the Figure 1 construction.

What is claimed is:

1. In a mechanical seal for sealing joints between relatively moving parts, an axially displaceable ring provided with an annular groove adapted to receive a number of sealing washers, a plurality of relatively thin sealing washers disposed within said annular groove and abutting one of said relatively moving parts, the width of said annular groove being greater than the sum of the thickness of said sealing washers, the outer and inner diametral surfaces of said sealing washers making an interference fit with a wall surface of said annular groove and said abutting part, said sealing washers during movement of said axially displaceable ring shifting within said annular groove so that only diagonally opposed edges of said diametral surfaces of each individual sealing washer contacts an adjacent wall surface of said annular groove and said abutting part to define a series of individual lines of sealing contact corresponding in number to the number of sealing washers contained within said annular groove.

2. In a mechanical seal for sealing joints between relatively moving parts, an axially displaceable ring provided with an annular groove adapted to receive a number of sealing washers, a plurality of relatively thin sealing washers disposed within said annular groove and abutting one of said relatively moving parts, the width of said annular groove being greater than the sum of the thickness of said sealing washers, the outer and inner diametral surfaces of said sealing washers making an interference fit with a wall surface of said annular groove and said abutting part, said sealing washers during movement of said axially displaceable ring shifting within said annular groove so that a tangent line taken with respect to the inner and outer diametral surfaces of each individual sealing washer forms an acute angle with respect to said wall surface of said annular groove to define a series of individual lines of sealing contact corresponding in number to the number of sealing washers contained within said annular groove.

References Cited in the file of this patent
UNITED STATES PATENTS

| | | |
|---|---|---|
| 583,451 | Brady | June 1, 1897 |
| 2,130,075 | Dennison | Sept. 13, 1938 |
| 2,673,103 | Tremolada | Mar. 23, 1954 |
| 2,760,794 | Hartranft | Aug. 28, 1956 |
| 2,817,544 | Von Der Nuell | Dec. 24, 1957 |
| 2,872,220 | Payne | Feb. 3, 1959 |

FOREIGN PATENTS

| | | |
|---|---|---|
| 783,197 | Great Britain | Sept. 18, 1957 |